(No Model.)
R. T. ELWELL.
RUBBER BALL.
No. 567,459. Patented Sept. 8, 1896.
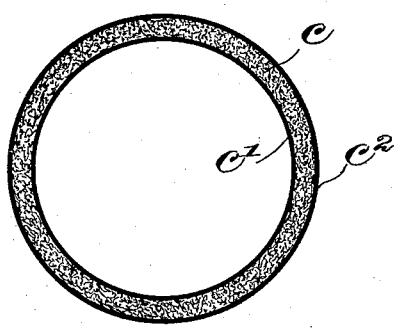
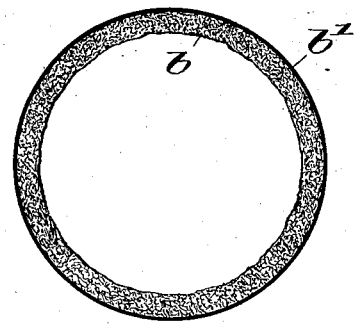

UNITED STATES PATENT OFFICE.

RUSSELL T. ELWELL, OF HYDE PARK, MASSACHUSETTS, ASSIGNOR OF ONE-HALF TO AMANDA M. LOUGEE, OF BOSTON, MASSACHUSETTS.

RUBBER BALL.

SPECIFICATION forming part of Letters Patent No. 567,459, dated September 8, 1896.

Application filed August 22, 1895. Serial No. 560,166. (No model.)

*To all whom it may concern:*

Be it known that I, RUSSELL T. ELWELL, of Hyde Park, county of Norfolk, State of Massachusetts, have invented an Improvement in Rubber Balls, of which the following description, in connection with the accompanying drawings, is a specification, like letters on the drawings representing like parts.

Large quantities of tennis-balls are used every year and owing to their construction they are quite expensive.

Each ball is made of a hollow shell of thin vulcanized rubber, air-tight, and protected by an external cover of felt or similar material.

The balls are easily punctured and sometimes a heavy blow will fracture them, rendering the ball useless in either case.

This invention has for its object the production of a strong and durable ball of sponge-rubber, which can, owing to the lightness of the material, be made a great deal thicker than the common rubber ball, and consequently is less readily punctured or fractured.

If desired, the surface may be slightly roughened, thus obviating the employment of a felt or other cover.

Figure 1 is a diametrical sectional view of a ball composed of sponge-rubber and embodying my invention, and Fig. 2 is a similar view of a sponge-rubber ball differing somewhat in construction.

In forming the ball $b$, Fig. 1, I take a portion of properly-prepared rubber sufficient to produce a ball of the desired weight, and placing it in a spherical mold subject the same to heat. The inclosed mass of rubber swells under the action of the heat, acquiring the shape of the mold and becoming thoroughly spongy during the vulcanizing. When the mold is opened and the ball removed, the latter will have a close-grained continuous spherical surface and a light spongy interior backing.

Such a ball will last indefinitely with the hardest usage. It can be made of any desired diameter and weight, and the surface closely approximates the texture of the felt cover commonly used for tennis-balls.

The ball is very cheap, both as to its material and process of manufacture. The hollow shell or sphere $b$, Fig. 1, may vary in thickness from one-quarter of an inch up, and the vulcanizing is carried to such a point that the continuous skin or outer surface $b'$ will be impervious to air. Should the outer skin be punctured the backing of sponge-rubber $b$ tends at once to close the aperture, so that usefulness of the ball is not impaired.

In Fig. 2 I have shown a hollow ball composed of sponge-rubber $c$, the inner and outer surfaces $c'$ $c^2$ being rendered air-tight.

Even should it be desired to cover the ball with felt, the thick shell of sponge-rubber described greatly strengthens the ball and increases its durability, and as the sponge-rubber is much cheaper than the fine rubber now used the cost of the ball is correspondingly decreased.

While the ball herein described is particularly well adapted for use as a tennis-ball its use is not restricted thereto.

I claim—

1. As a new article of manufacture, a ball composed of a hollow shell of sponge-rubber, one of the continuous, spherical surfaces of the shell being impervious to air, the sponge-rubber forming a backing to resist puncture, substantially as described.

2. As a new article of manufacture, a ball composed of a hollow shell of sponge-rubber, having its inner and outer surfaces continuous and impervious to air, the sponge-rubber forming a backing to resist puncture, substantially as described.

In testimony whereof I have signed my name to this specification in the presence of two subscribing witnesses.

RUSSELL T. ELWELL.

Witnesses:
JOHN C. EDWARDS,
AUGUSTA E. DEAN.